United States Patent
Pierre et al.

(10) Patent No.: US 10,632,700 B2
(45) Date of Patent: Apr. 28, 2020

(54) RELEASE MECHANISM FOR A TIRE MOLD PLATE

(71) Applicant: The Goodyear Tire & Rubber Company, Akron, OH (US)

(72) Inventors: Christophe Jean Alexis Pierre, Aubange (BE); Michael Colback, Metzert (BE); Emre Öztop, Kocaeli (TR)

(73) Assignee: The Goodyear Tire & Rubber Company, Akron, OH (US)

( * ) Notice: Subject to any disclaimer, the term of this patent is extended or adjusted under 35 U.S.C. 154(b) by 256 days.

(21) Appl. No.: 15/810,244

(22) Filed: Nov. 13, 2017

(65) Prior Publication Data
US 2019/0143620 A1    May 16, 2019

(51) Int. Cl.
*B29D 30/06*  (2006.01)

(52) U.S. Cl.
CPC ..... *B29D 30/0662* (2013.01); *B29D 30/0605* (2013.01); *B29D 30/0606* (2013.01); *B29D 30/0681* (2013.01); *B29D 2030/0607* (2013.01); *B29D 2030/0609* (2013.01); *B29D 2030/0618* (2013.01)

(58) Field of Classification Search
CPC .. B29D 30/0606; B29D 30/72; B29C 33/306; B29C 33/424
See application file for complete search history.

(56) References Cited

U.S. PATENT DOCUMENTS

| | | | |
|---|---|---|---|
| 2,296,016 A * | 9/1942 | Bostwick | B29C 33/424 425/28.1 |
| 3,989,428 A | 11/1976 | Cox | |
| 4,274,820 A | 6/1981 | Fike | |
| 4,547,139 A * | 10/1985 | Hershberger | B29D 30/0606 425/192 R |
| 6,315,539 B1 * | 11/2001 | Yutronkie | B29D 30/0606 249/103 |
| 8,272,861 B1 | 9/2012 | Fike | |
| 10,029,433 B1 * | 7/2018 | Ohara | B29D 30/0606 |
| 2004/0032053 A1 * | 2/2004 | Parmelee | B29C 33/32 264/236 |
| 2015/0086664 A1 * | 3/2015 | Zhang | B29C 33/10 425/28.1 |
| 2015/0251367 A1 * | 9/2015 | Cocural | B29D 30/0606 264/219 |

(Continued)

FOREIGN PATENT DOCUMENTS

KR    20030087820    11/2003

OTHER PUBLICATIONS

European Search Report for Serial No. 18204442 dated Apr. 18, 2019.

*Primary Examiner* — Nahida Sultana
(74) *Attorney, Agent, or Firm* — Robert N. Lipcsik

(57) ABSTRACT

A mechanism releases a plate from a recess in a tire mold part. The mechanism includes a bolt insertable into a hole in the tire mold part and extending from a first end at an outer surface of the tire mold part to a second end at a recess for a pocket plate in the tire mold part. The first end of the bolt has an axially extending projection allowing manipulation of the bolt about an axis within the hole. The projection is defined by two diametrically opposite curved surfaces interconnected by two diametrically opposite planar surfaces.

4 Claims, 4 Drawing Sheets

(56) References Cited

U.S. PATENT DOCUMENTS

2016/0167326 A1* 6/2016 Marchadier ........ B29D 30/0629
                                                    264/326
2018/0207892 A1* 7/2018 Furutani ............ B29D 30/0606
2018/0319111 A1* 11/2018 Ishihara ............. B29D 30/0606
2019/0009485 A1* 1/2019 Smeltzer ................. B29D 30/06
2019/0176367 A1* 6/2019 Ohara ..................... B29C 33/02
2019/0193353 A1* 6/2019 Onimatsu .......... B29D 30/0605
2019/0217563 A1* 7/2019 Severyn ............. B29D 30/0606
2019/0366593 A1* 12/2019 Ohara ................... B29C 33/424

* cited by examiner

RELEASE MECHANISM FOR A TIRE MOLD PLATE

FIELD OF THE INVENTION

The present invention relates to molds for manufacturing new tires and molds for retreading tires. More particularly, the present invention relates to a mechanism for releasing a removable plate from a hot mold.

BACKGROUND OF THE INVENTION

Such pocket plates are inserts for a mold side wall ring that are used to mold information onto a tire sidewall, for example, tire brand information or a bar code for inventory identification. A mold side wall ring may be used over a relatively long period of time, and for molding different versions of a single tire model. The removable plates are changed when the information on the plate needs to be changed for different tire molding requirements.

In some conventional molds, pocket plates are held in place in a mold by magnets, by screws fastened from the front of the plate, or by screws fastening the plates from the back of the side wall ring. In the case of magnets, when the mold is heated, the side wall ring and plate expand, which provides friction to help hold the plate in place.

The conventional means of holding pocket plates in side wall rings present drawbacks. In molds in which the plates are fastened with front attaching screws, the screw heads leave a mark on the molded tire. When the screws are fastened from the back of the plate, the mold must be first removed from the press to gain access to the screws. Once the plate is changed, the mold must be reinstalled and realigned in the press, which involves time and effort. The magnet fastened plates must be allowed to cool before they can be removed, which causes delay, and additionally are difficult to grasp for removal because of the lack of an edge or grip on the surface of the plate.

Another conventional device removes pocket plates from a mold. A mold half may have a recess to receive a pocket plate. A rod may be inserted in a hole in a mold half part. A first end of the rod may be disposed at an accessible outer surface of the mold half part. A second end of the rod may be disposed in a position adjacent to the pocket plate recess. The rod may be movable in the hole and include a cam surface that may be selectably moved into the recess to push on the pocket plate by movement of the rod.

The conventional rod may be rotatable in the hole and the cam surface may be radially arranged on the rod for movement upon rotation. In addition, the second end may include a hook radially opposite the cam surface for engaging a catch on the back surface of the pocket plate to secure the pocket plate in the recess. The conventional rod may alternatively be slidable in the hole with the cam being linearly arranged on the second end of the rod. The rod may include a tab for engaging a slot in the pocket plate to selectably secure the pocket plate in the recess.

SUMMARY OF THE INVENTION

A mechanism in accordance with the present invention releases a plate from a recess in a tire mold part. The mechanism includes a bolt insertable into a hole in the tire mold part and extending from a first end at an outer surface of the tire mold part to a second end at a recess for a pocket plate in the tire mold part. The first end of the bolt has an axially extending projection allowing manipulation of the bolt about an axis within the hole. The projection is defined by two diametrically opposite curved surfaces interconnected by two diametrically opposite planar surfaces.

According to another aspect of the mechanism, the projection is radially offset from the axis of the bolt.

A tire mold in accordance with the present invention cures a tire. The tire mold includes a mold half part, a sidewall ring, and a bolt. The sidewall ring is supported by the mold half part and has a recess for an indicia plate. The indicia plate is releasably mounted in the recess of the sidewall ring. The bolt is inserted through a hole in the sidewall ring. The hole extends from an outer surface of the sidewall ring to the recess. The bolt is movably supported in the hole and has a grip member for allowing selective rotation of the bolt about an axis. The bolt further has an axially extending projection defined by two diametrically opposite curved surfaces interconnected by two diametrically opposite planar surfaces such that the axially extending projection is radially offset from the axis of the bolt.

According to another aspect of the tire mold, the bolt is removed from the hole subsequent to the indicia plate being secured to the sidewall ring by a threaded fastener.

BRIEF DESCRIPTION OF THE DRAWINGS

Various objects, features, aspects, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF EXAMPLES OF THE PRESENT INVENTION

Figure 1:
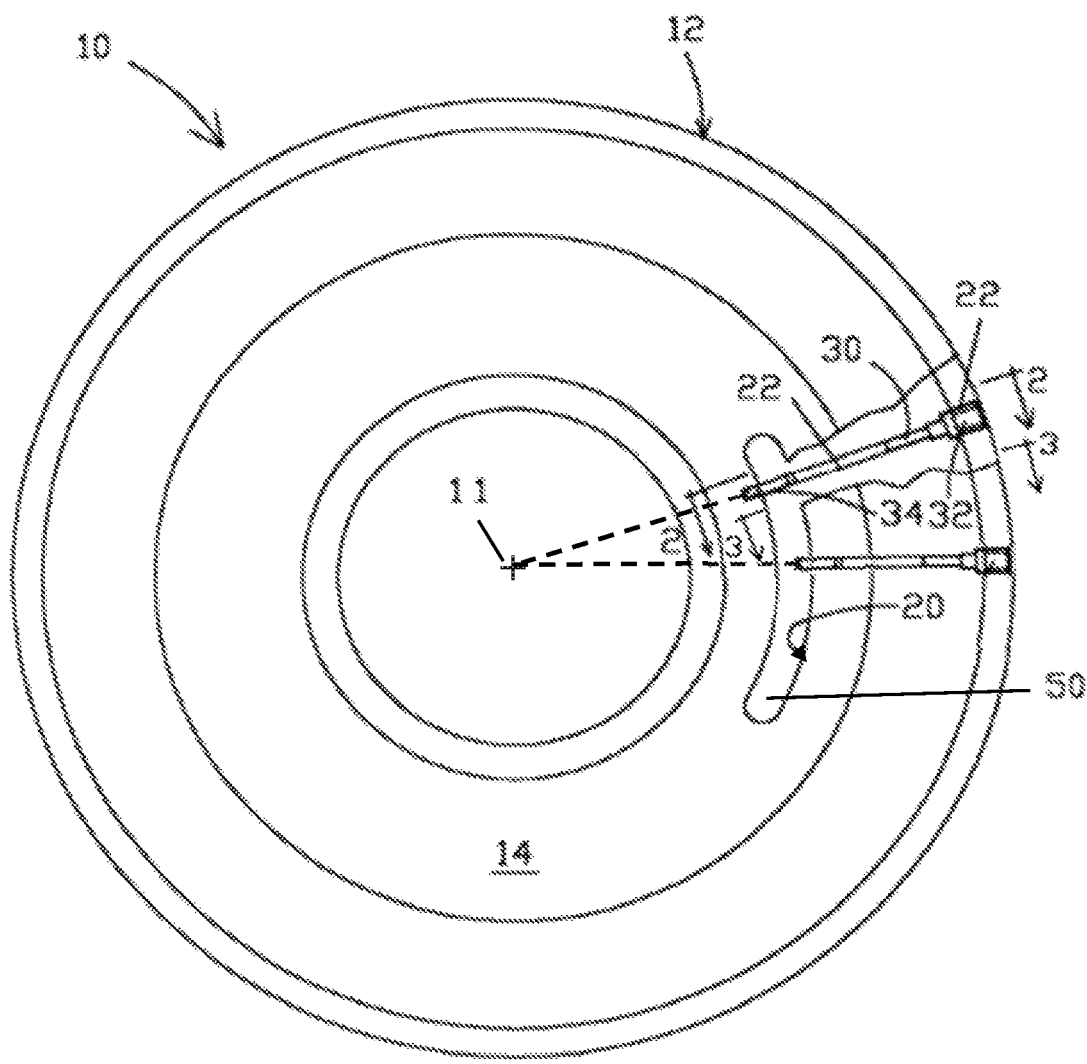
FIG. 1 is a schematic top view of a tire mold part showing, in partial section, a release mechanism in accordance with the present invention.
Figure 2:
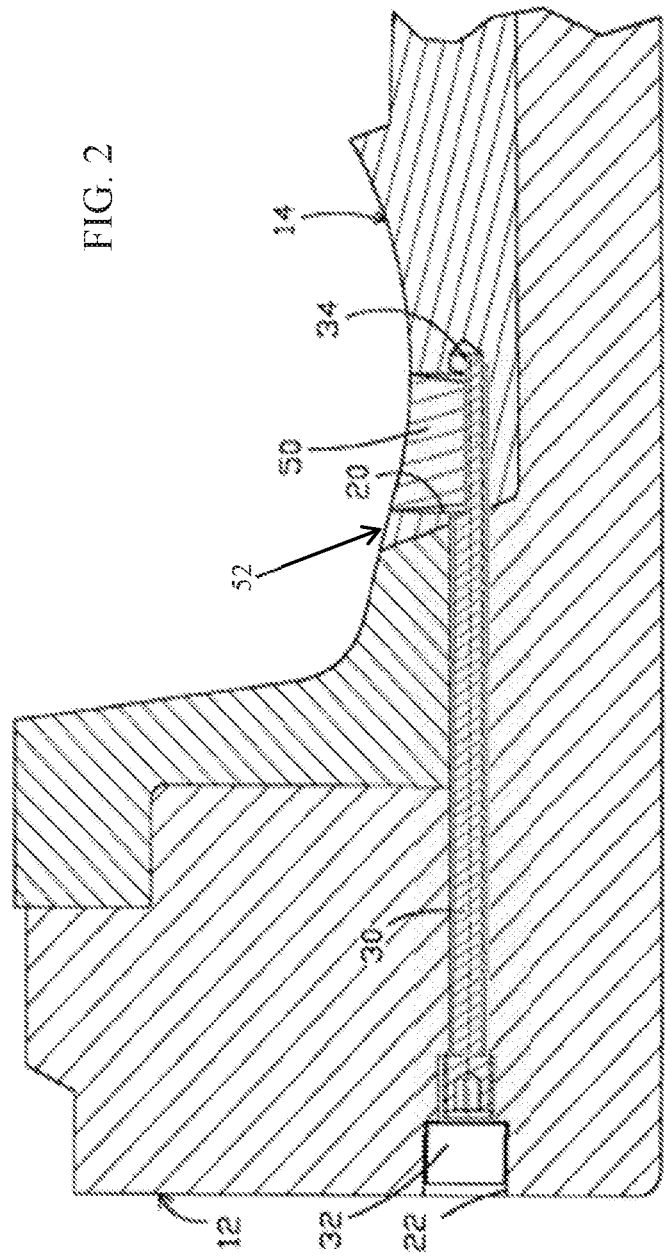
FIG. 2 is a schematic section view of the mold part taken along the line 2-2 in FIG. 1.

FIG. 1 is a top view of a tire mold part 10, as described in U.S. Pat. No. 6,315,539, incorporated herein by reference in its entirety. The tire mold part 10 may include a sidewall ring (FIG. 2). The tire mold part 10 may contact and form one sidewall of a tire. A second mold part (not shown) may form an opposite sidewall of the tire, and tread mold forming segments (not shown) may be positioned in the radial direction to the first tire mold part 10 and the second mold part. The assembled mold parts and tread segments may be placed in a press that holds the assembled parts together as they are heated thereby curing the tire.

The tire mold part 10, and the opposite second mold part, may include aspects that imprint information and ornamental features into each tire sidewall. For example, a brand name and model of the tire, the tire size, load rating, and pressure specifications may be imprinted, or molded, onto the sidewalls. The information and features for the tire may change for different tire lines. For example, when a mold is used to make tires for a private label customer, the brand name may change. For such information, the mold parts may include a removable plate, or slug, 50 inserted into a recess 20 in the mold parts.

The present invention is directed to a mechanism allowing quick and easy removal and insertion such plates 50 such that the plate may be replaced without removing the entire mold from the press. In conventional molds, such plates may be secured in the mold parts by screws, either mounting from the front or rear of the plate, or by magnets. Removal of plates held by either means may awkward and time consuming.

Figure 3:
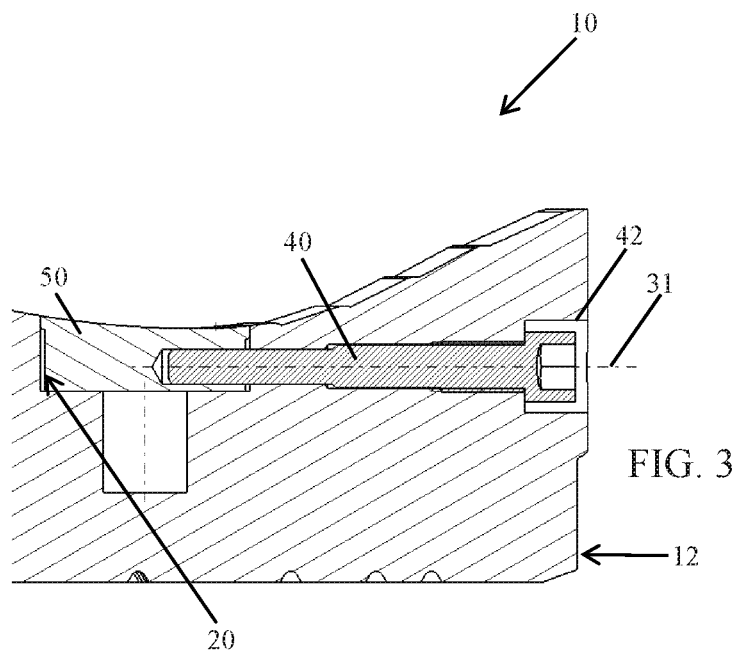
FIG. 3 is a schematic section view of the mold part taken along line 3-3 in FIG. 1.
Figure 4:
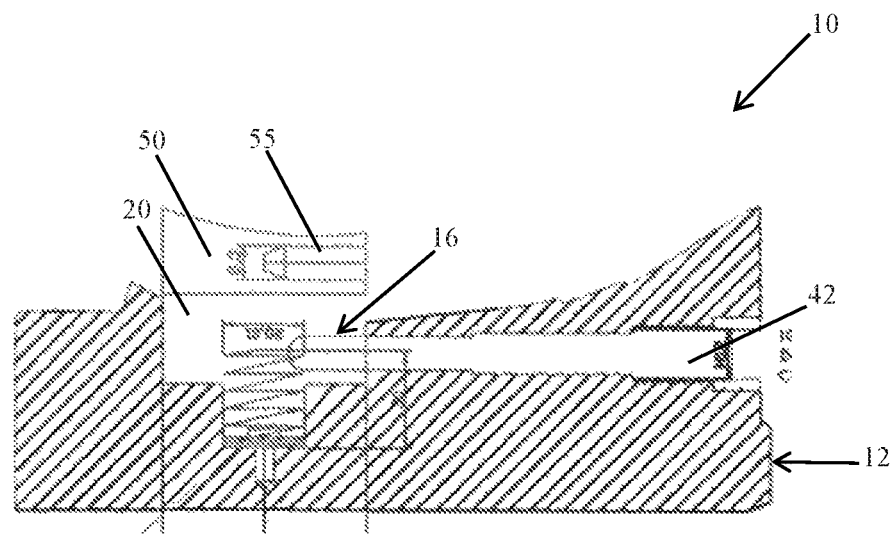
FIG. 4 is a schematic section view of the mold part showing another aspect of the mechanism.

A non-threaded bolt or rod 30 in accordance with the present invention may be inserted in a hole 22 in the mold part 10. The hole 22 may extend from an outer surface 12 of the mold part 10 to a position adjacent the recess 20. A first end 32 of the rod 30 may be disposed at an outer surface 12 so that the first end may be manipulated to move the rod, as described below. The first end 32 of the rod 30 may have a grip member for facilitating manipulation of the rod, such as a knurled knob, a flat head screwdriver head, a phillips screwdriver head, etc. A second end 34 of the rod 30 may be disposed adjacent the recess 20. The rod 30 may move in the hole 22 to effect release of a plate 50 in the recess 20. As shown in FIGS. 3 & 4, separate from the rod 30, the plate 50 may be secured to the mold part 10 by one or more bolts or fasteners or screws 40 projecting through additional non-threaded holes 42 in the mold part and engaging additional threaded counterbore holes 55 in the plate during normal operation of the mold part. The non-threaded holes 42 in the mold part 10, the counterbore holes 55 in the plate 50, and the hole 22 for the rod 30 may extend radially toward the center 11 of the mold part 10.

Figure 5:
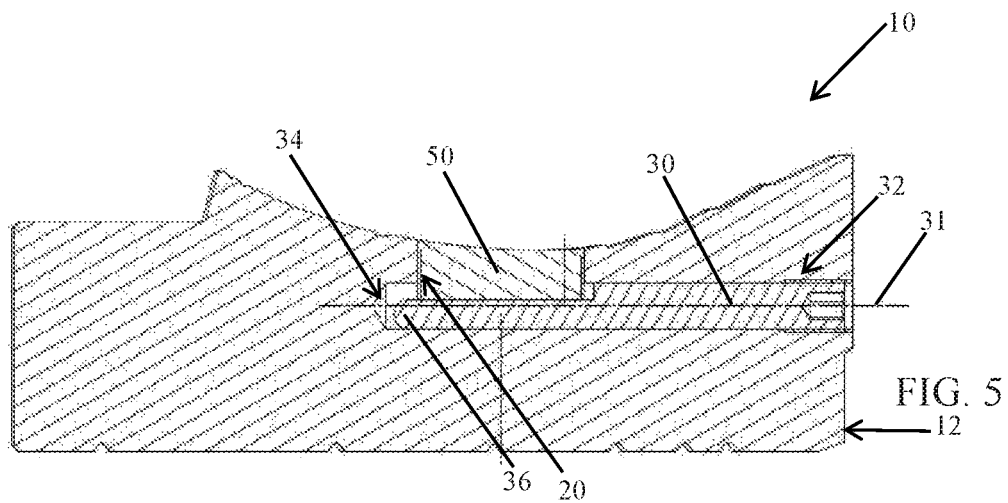
FIG. 5 is a schematic section view of the mold part showing another aspect of the mechanism.
Figure 6:
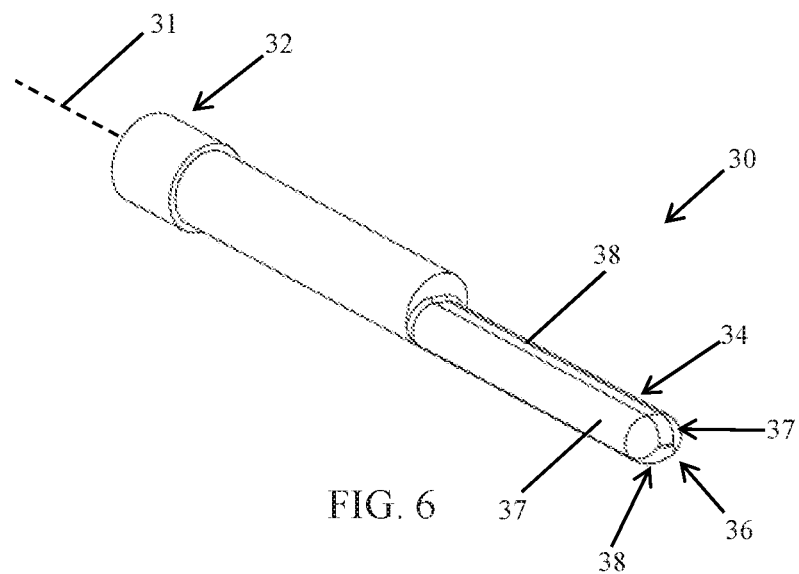
FIG. 6 is a schematic perspective view of part of the mechanism of FIG. 5.

As described above, the plate 50 may be inserted into the recess 20 in the mold part 10 such that an inner contact surface 14 of the mold part may be flush with an outer surface 52 of the plate such that indicia on the outer surface may imprint onto a sidewall of a tire. The recess 20 may be formed in a side wall ring of the mold part 10. The rod 30 may thereby be rotatable within the hole 22. The first end 32 of the rod 30 may include tool engaging means, such as a hex head hole, a slot, or other suitable structure. The second end 34 of the rod 30 may include a plate engaging projection 36 radially offset from an axis 31 of rotation of the entire rod, as shown in FIGS. 5 & 6. Rotation of the rod 30 may cause the projection 36 to contact and press outward against the plate 50. The projection 36 may be shaped so that it will push the plate 50 sufficiently free of the recess 20 to be removed by an operator (See FIG. 4). The plate 50 may be alternatively secured against one or more spring elements 16 for further facilitating removal of the plate by an operator.

As shown in FIG. 6, the axially extending projection 36 may include two diametrically opposite curved surfaces 37 connected by two diametrically opposite planar surfaces 38. As shown in FIGS. 2 & 5, the rod 30 may be stored and inserted only when the plate 50 requires removal from the recess 20 after the screws 40 have been removed.

A mold part may have as many removable plates and release mechanisms as needed. The present invention is not limited to a particular mold type, and those skilled in the art will understand how to apply the principles of the present invention to various molds. The described structures and examples are meant to be illustrative and not limiting, and those skilled in the art will appreciate that substitutions of equivalents may be made without departing from the scope of the present invention as defined by the following claims.

What is claimed:

1. A mechanism for releasing a plate from a recess in a tire mold part, the mechanism comprising:
    a bolt insertable into a hole in the tire mold part and extending from a first end at an outer surface of the tire mold part to a second end at a recess for a pocket plate in the tire mold part, the second end of the bolt having an axially extending projection allowing manipulation of the bolt about an axis,
    the projection being defined by two diametrically opposite curved surfaces interconnected by two diametrically opposite planar surfaces.

2. The mechanism as set forth in claim 1 wherein the projection is radially offset from the axis of the bolt.

3. A tire mold part for curing a tire comprising:
    a mold half part;
    a sidewall ring supported by the mold half part and having a recess for an indicia plate, the indicia plate being releasably mounted in the recess of the sidewall ring; and
    a bolt inserted through a hole in the sidewall ring, the hole extending from an outer surface of the sidewall ring to the recess, the bolt being movably supported in the hole and having a grip member for allowing selective rotation of the bolt about an axis, the bolt further having an axially extending projection defined by two diametrically opposite curved surfaces interconnected by two diametrically opposite planar surfaces such that the axially extending projection is radially offset from the axis of the bolt.

4. The tire mold part as set forth in claim 3 wherein the bolt is removed from the hole subsequent to the indicia plate being secured to the sidewall ring by a threaded fastener.

* * * * *